US011548956B2

(12) United States Patent
Cadix et al.

(10) Patent No.: US 11,548,956 B2
(45) Date of Patent: Jan. 10, 2023

(54) GELLED AQUEOUS COMPOSITION FOR OIL EXTRACTION

(71) Applicant: RHODIA OPERATIONS, Aubervilliers (FR)

(72) Inventors: Arnaud Cadix, Lille (FR); David James Wilson, Coye-La-Foret (FR)

(73) Assignee: RHODIA OPERATIONS, Aubervilliers (FR)

(*) Notice: Subject to any disclaimer, the term of this patent is extended or adjusted under 35 U.S.C. 154(b) by 9 days.

(21) Appl. No.: 17/041,532

(22) PCT Filed: Apr. 10, 2019

(86) PCT No.: PCT/EP2019/059021
§ 371 (c)(1),
(2) Date: Sep. 25, 2020

(87) PCT Pub. No.: WO2019/197435
PCT Pub. Date: Oct. 17, 2019

(65) Prior Publication Data
US 2021/0115165 A1 Apr. 22, 2021

(30) Foreign Application Priority Data

Apr. 10, 2018 (FR) ...................... 1853116

(51) Int. Cl.
*C09K 8/68* (2006.01)
*C08F 2/26* (2006.01)
*C09K 8/508* (2006.01)

(52) U.S. Cl.
CPC .............. *C08F 2/26* (2013.01); *C09K 8/5083* (2013.01)

(58) Field of Classification Search
CPC .......... C08F 2/26; C08F 2438/03; C08F 2/10; C08F 293/005; C09K 8/5083; C09K 8/68; C09K 8/88
See application file for complete search history.

(56) References Cited

U.S. PATENT DOCUMENTS

| | | | |
|---|---|---|---|
| 4,172,066 A | 10/1979 | Zweigle et al. | |
| 4,565,647 A | 1/1986 | Llenado | |
| 2010/0256018 A1 | 10/2010 | Ezell | |
| 2011/0092634 A1* | 4/2011 | Gonzalez | C08L 53/00 526/263 |
| 2014/0378617 A1* | 12/2014 | Wilson | C09K 8/882 525/291 |
| 2016/0298023 A1 | 10/2016 | Cadix | |

FOREIGN PATENT DOCUMENTS

| | | | |
|---|---|---|---|
| FR | 2794464 A1 | 4/1999 | |
| RU | 2276161 C2 | 5/2006 | |
| WO | 9630421 | 10/1996 | |
| WO | 9801478 | 1/1998 | |
| WO | 9858974 A1 | 12/1998 | |
| WO | 9931144 A1 | 6/1999 | |
| WO | 9935177 A1 | 7/1999 | |
| WO | 9935178 | 7/1999 | |
| WO | 0075207 A1 | 12/2000 | |
| WO | 0142312 A1 | 6/2001 | |
| WO | 03068827 A1 | 8/2003 | |
| WO | 03068848 A2 | 8/2003 | |
| WO | 2005021612 A1 | 3/2005 | |
| WO | 17072035 A1 | 5/2017 | |
| WO | 2017072035 A1 | 5/2017 | |
| WO | WO 2017/072035 | * 5/2017 | |
| WO | 2017129434 A1 | 8/2017 | |
| WO | 0226836 A2 | 4/2020 | |

OTHER PUBLICATIONS

Deniz (Deniz, C.T. et al, Tough and Self-Healing Hydrogels Formed via Hydrophobic Interactions, Macromolecules, 44, 2011, 4997-5005).*
Hong (Hong, C et al., A Novel Design of Multi-Mechanoresponsive and Mechanically Strong Hydrogels, Advanced Materials, 29, 2017, 1606900).*
Chuanrong (Chuanrong, et al. Characterization, Solution Properties, and Morphologies of a Hydrophobically Associating Cationic Terpolymer, Journal of Polymer Science, Part B: Polymer Physics, 45, 2007, 826-839).*
Deniz C. Tuncaboylu et al. "Tough and Self-Healing Hydrogels Formed via Hydrophobic Interactions" Macromolecules, US Vo. 44, No. 12, Jun. 2, 2011 (Jun. 2, 2011), pp. 4997-5005 DOI: 10.1021/ma200579v ISSN:0024-9297, XP055528091 Experimental Part; p. 4998 Gel-B; p. 5003, col. 1.
Hong Chen et al. "A Novel Design of Multi-Mechanoresponsive and Mechanically Strong Hydrogels" Advanced Materials, DE, vol. 29, No. 21, Mar. 15, 2017 (Mar. 15, 2017), p. 1606900 DOI: 10.1002/adma. 201606900 ISSN: 0935-9648, XP055528073 p. 2; figure 1 Experimental Section; p. 7.
Chuanrogn Zhong et al. "Characterization, solution properties, and morphologies of a hydrophobically associating cationic terpolymer" Journal of Polymer Science Part B: Polymer Physics, US, vol. 45, No. 7, Feb. 22, 2007 (Feb. 22, 2007), pp. 826-839 DOI: 10.1002/polb.21097 ISSN: 0887-6266, XPO55527100 Experimental: p. 827-p. 828.
Office Action issued in corresponding Russian Application No. 2020136423; dated Jun. 10, 2022 (26 pages).

* cited by examiner

*Primary Examiner* — Kumar R Bhushan
(74) *Attorney, Agent, or Firm* — Osha Bergman Watanabe & Burton LLP

(57) ABSTRACT

The present invention relates to the field of oil extraction. More specifically, it relates to a particular polymerization process, which provides access to formulations of polymers that may be used in particular for modifying rheology and fluid loss control during extraction operations and that have a better heat stability.

12 Claims, No Drawings

GELLED AQUEOUS COMPOSITION FOR OIL EXTRACTION

This application is a U.S. national phase entry under 35 U.S.C. § 371 of International Application No. PCT/EP2019/059021, filed on Apr. 10, 2019, which claims priority to French Application No. 1853116, filed on Apr. 10, 2018. The entire contents of these applications are explicitly incorporated herein by this reference.

The present invention relates to the field of oil extraction. More specifically, it relates to a particular polymerization process, which provides access to formulations of polymers that may be used in particular for modifying rheology and fluid loss control during operations carried out in hydrocarbon exploration and production steps.

In order to modify the rheology and to ensure fluid loss control, it is known practice to use water-soluble polymers, in particular compositions referred to as microgels or nanogels which comprise polymers dispersed in the form of particles of micrometric or nanometric sizes.

U.S. Pat. No. 4,172,066 describes for example the use of a microgel as a thickener which also makes it possible to reduce the permeability of the rock formation. The microgel comprises water and a crosslinked polymer based on ethylenically unsaturated hydrophilic monomers, prepared by inverse emulsion polymerization (water-in-oil polymerization) wherein the aqueous solution of monomers is added to the oil phase with stirring. The microgels obtained at the end of the polymerization are separated from the reaction medium by adding a flocculating agent and then filtered, washed and then dried before use.

US 2010/0256018 describes microgels synthesized from hydrophilic monomers and hydrophilic crosslinking agents, that are soluble in the reaction medium. The polymerization results in the obtaining of a dispersion, the polymers obtained being insoluble in the medium and being, in the end, in the form of insoluble dispersed particles (microgel).

These processes generally result in relatively limited polymer contents, namely relatively dilute microgels, and have disadvantages such as the need to implement complex recovery methods or treatment with organic solvents.

Another drawback of these processes is that the microgels obtained according to the abovementioned methods have a relatively low stability, in particular at high temperature where a chemical degradation is often observed (namely typically at temperatures above 100° C., or even above 150° C.), which is an impediment to their use in an application in the oil exploration and production field, where a minimum stability duration (e.g. several hours or several days) is required and/or where the implementation temperature is generally high.

An aim of the present invention is that of providing new compositions which may be used to modify the rheology and/or to control the filtration phenomena or the permeability of rock formations during oil or gas exploration or production operations and which preferably have a better stability than the microgels described in the past, and in particular at a temperature above 100° C., or even above 150° C.

To this effect, the present invention provides compositions of specific polymers with an overall hydrophilic nature, which are both crosslinked and bearers of hydrophobic blocks. The invention also provides a process for synthesising the abovementioned compositions which may for example be used as a rheology control agent and a fluid loss control agent.

More specifically, according to a first aspect, one subject of the present invention is a process for preparing a polymer, which comprises a polymerization step (E) wherein the following are brought into contact, in an aqueous medium (M):

monomers (m1), dissolved or dispersed in said aqueous medium (M), termed hydrophilic monomers;

monomers (m2) in the form of a micellar solution, namely a solution containing, in dispersed form in the medium (M), micelles comprising these monomers (m2), termed hydrophobic monomers;

wherein said monomers (m1) and/or (m2) comprise crosslinking monomers (mR) comprising at least two ethylenic unsaturations;

at least one radical polymerization initiator, which is preferably water-soluble or water-dispersible; and preferably at least one radical polymerization control agent.

The polymers used in the context of the present invention have the specific characteristics of the polymers obtained according to the micellar radical polymerization technique.

For purposes of the present description, the term "micellar radical polymerization" is intended to mean a polymerization which also will be denoted by "micellar polymerization" for the purposes of brevity in the continuation of the description, wherein block polymers of multiblock type are synthesized by copolymerization of hydrophilic monomers and of hydrophobic monomers within an aqueous dispersing medium (typically water or a water/alcohol mixture) which comprises:

hydrophilic monomers in dissolved form or dispersed form in said medium; and the hydrophobic monomers present within micelles.

The micelles used in micellar polymerization are formed in the aqueous medium by a surfactant which forms these micelles, which is introduced into said medium at a concentration greater than its critical micelle concentration (cmc) in the presence of the hydrophilic monomers in the medium (M).

According to one specific mode, the hydrophobic monomers present within micelles used in micellar polymerization may be monomers which in themselves have the property of forming micelles, without having, in order to do this, the need to add additional surfactants (these monomers are said to be "self-micellizable" in the continuation of the description). According to this specific mode, the surfactant used to form the micelles may be the self-micellizable hydrophobic monomer itself used without other surfactant, but the presence of an additional surfactant is not, however, excluded when self-micellizable monomers are used.

Thus, for the purposes of the present description, when mention is made of "hydrophobic monomers within micelles", this notion encompasses in particular:

mode 1: hydrophobic monomers present within micelles formed by surfactants, where said surfactants are distinct from the hydrophobic monomers; and/or mode 2: self-micellizable monomers forming by themselves micelles in an aqueous medium, with micelles which may then be formed in all or in part by said self-micellizable monomers.

The abovementioned modes 1 and 2 are compatible and may coexist (hydrophobic monomers which are not self-micellizable within micelles formed by another self-micellizable monomer, for example; or alternatively micelles comprising a combination of surfactants and of self-micellizable monomers).

In micellar polymerization, whatever the exact nature of the micelles, the hydrophobic monomers contained in the micelles are said to be in "micellar solution". The micellar solution to which reference is made is a microheterogeneous system which is generally isotropic, optically transparent and thermodynamically stable.

It should be noted that a micellar solution of the type used in micellar polymerization should be distinguished from a microemulsion. In particular, in contrast with a microemulsion, a micellar solution is formed at any concentration exceeding the critical micelle concentration of the surfactant used, with the sole condition that the hydrophobic monomer be soluble at least to a certain extent within the internal space of the micelles. A micellar solution furthermore differs from an emulsion due to the absence of a homogeneous internal phase: the micelles contain a very small number of molecules (typically less than 1000, generally less than 500 and typically from 1 to 100, with most often 1 to 50, monomers, and at most a few hundred surfactant molecules, when a surfactant is present) and the micellar solution generally has physical properties similar to those of the monomer-free surfactant micelles. Furthermore, usually, a micellar solution is transparent with regard to visible light, in view of the small size of the micelles, which does not result in scattering phenomena, unlike the drops of an emulsion, which scatter light and give it its characteristic cloudy or white appearance. Typically, the micelle size in the micellar solution is less than 50 nanometers, or even less than 10 nanometers.

The micellar polymerization technique results in characteristic block polymers which each contain several hydrophobic blocks of substantially the same size and where this size may be controlled. This is because, in view of the confinement of the hydrophobic monomers within the micelles, each of the hydrophobic blocks formed is of controlled size and contains substantially a defined number $n_H$ of hydrophobic monomers, it being possible for this number $n_H$ to be calculated as follows (*Macromolecular Chem. Physics*, 202, 8, 1384-1397, 2001):

$$n_H = N_{agg} \cdot [M_H] / ([\text{surfactant}] - cmc)$$

wherein said formula:
  $N_{agg}$ is the aggregation number of the surfactant, which reflects the surfactant number present in each micelle;
  $[M_H]$ is the molar concentration of hydrophobic monomer in the medium;
  [surfactant] is the molar concentration of surfactant in the medium; and
  cmc denotes the (molar) critical micellar concentration in the reaction medium.

The micellar polymerization technique thus allows advantageous control of the hydrophobic units introduced into the polymers formed, namely:
  overall control of the mole fraction of hydrophobic units in the polymer (by adjusting the ratio of the concentrations of the two monomers); and
  more specific control of the number of hydrophobic units present in each of the hydrophobic blocks (by modifying the parameters influencing the $n_H$ defined above).

The polymers obtained in micellar polymerization are amphiphilic block polymers which have a specific controlled structure, namely, schematically, based on a backbone formed of hydrophilic (water-soluble or water-dispersible) units interrupted at various places by small hydrophobic blocks, these hydrophobic blocks all being of substantially identical monomer unit number.

Given the use of the particular monomers (mR) in step (E), the polymers obtained according to the invention are also crosslinked. The compositions of polymers obtained according to the process of the invention are as a result in the form of a chemically crosslinked gel, also referred to hereinafter as "macrogel".

The crosslinking monomers (mR) used in step (E) may comprise hydrophobic crosslinking monomers (mR2) which then constitute all or part of the hydrophobic monomers (m2) and/or hydrophilic crosslinking monomers (mR1) which then constitute in general only a part of the hydrophilic monomers (m1).

In other words:
  the hydrophobic monomers (m2) may include hydrophobic monomers of non-crosslinking type (m'2) and/or crosslinking monomers (mR2); and
  the hydrophilic monomers (m1) include hydrophilic monomers of non-crosslinking type (m'1) and optionally crosslinking monomers (mR1);
  it being understood that the monomers (m1) and/or (m2) comprise at least crosslinking monomers (mR1 and/or mR2).

According to a first advantageous embodiment, step (E) is carried out in the presence of hydrophobic monomers (m2) which comprise, or even consist exclusively of, hydrophobic crosslinking monomers (mR2). For example, they may comprise more than 90%, typically more than 95%, or even more than 99% of hydrophobic crosslinking monomers (mR2) by weight relative to the total weight of the hydrophobic monomers. The macrogels obtained according to this embodiment have a heat stability which is generally particularly high.

According to a second mode compatible with the first (and which is preferably combined in the context of the invention), step (E) is carried out in the presence of hydrophilic monomers (m1), only a part of which consists of crosslinking monomers (mR1). According to this mode, the hydrophilic monomers typically comprise less than 5%, and most generally less than 1% of monomers (mR1), or even less than 0.5% by weight, relative to the total weight of the hydrophilic monomers.

Thus, the monomers used in step (E) may consist of:
  (i) a mixture of non-crosslinking hydrophilic monomers (m'1), of non-crosslinking hydrophobic monomers (m'2), and of crosslinking hydrophobic monomers (mR2); or
  (ii) a mixture of non-crosslinking hydrophilic monomers (m'1), of crosslinking hydrophilic monomers (mR1), and of non-crosslinking hydrophobic monomers (m'2); or
  (iii) a mixture of non-crosslinking hydrophilic monomers (m'1), and of crosslinking hydrophobic monomers (mR2); or
  (iv) a mixture of non-crosslinking hydrophilic monomers (m'1), of crosslinking hydrophilic monomers (mR1), and of crosslinking hydrophobic monomers (mR2); or
  (v) a mixture of non-crosslinking hydrophilic monomers (m'1), of crosslinking hydrophilic monomers (mR1), and of non-crosslinking hydrophobic monomers (m'2), and of crosslinking hydrophobic monomers (mR2).

According to one particular embodiment, the monomers used in step (E) consist of a mixture of non-crosslinking hydrophilic monomers (m'1), and of crosslinking hydrophobic monomers (mR2).

According to another particular embodiment, the monomers used in step (E) consist of a mixture of non-crosslinking hydrophilic monomers (m'1), of non-crosslinking hydrophobic monomers (m'2), and of crosslinking hydrophobic monomers (mR2).

According to another particular embodiment, the monomers used in step (E) consist of a mixture of non-crosslinking hydrophilic monomers (m'1), of crosslinking hydrophilic monomers (mR1), and of crosslinking hydrophobic monomers (mR2).

Unexpectedly, the inventors have discovered that crosslinking monomers (mR) may be used in a conventional radical micellar polymerization process without that disrupting the polymerization mechanism, thereby making it possible to obtain the usual advantages of radical micellar polymerization, and that they also make it possible to effectively provide covalent chemical bonds between the polymer chains.

Advantageously, the process of the invention comprises, after step (E), a step (E2) wherein the polymers obtained at the end of step (E) are milled (typically after a drying step), as a result of which the polymers are obtained in the form of dispersed particles, of smaller sizes, typically in the form of particles having dimensions less than 200 μm, more preferentially less than 100 μm and typically greater than 0.1 μm, and more preferentially greater than 1 μm. The size of the particles obtained may be measured for example by dry laser particle size analysis.

In order to carry out step (E2), it is desirable to eliminate all or part of the solvents used in step (E). In this context, one advantage of the present invention is that, since the process is carried out in aqueous media, it is easy to isolate the polymers resulting from the polymerization, in particular compared to the inverse emulsion polymerization preparation processes, described above, which generally require an extensive post-treatment in order to separate the polymers from the oils and/or solvents contained in the reaction medium.

The size of the particles obtained at the end of step (E2) may be modulated by the milling intensity, in a manner known per se. When drying is carried out, the polymer is obtained in the form of a powder at the end of step (E2). The conventional milling and drying means known to those skilled in the art may be used. By way of example, mention may be made of the technique of drying in a fluid bed and milling by means of pin mills, hammer mills, ball mills, air jet milling. These techniques may be carried out according to the cryomilling mode.

The polymer particles resulting from step (E2), once dispersed in water, form a gelled aqueous composition. The process of the invention thus provides access to a gelled aqueous composition based on crosslinked polymers. In the remainder of the description, this composition will be denoted by the term "microgel".

In a microgel as obtained according to the invention, the polymers are all in the form of dispersed objects typically having dimensions less than 1 000 μm, typically less than 500 μm, and more preferentially less than 100 μm and typically greater than 0.5 μm, and more preferentially greater than 5 μm. The size of the dispersed particles may for example be measured by the dynamic light scattering method.

The microgels obtained according to the invention have a high heat stability that is typically greater than that of the microgels disclosed in the abovementioned documents, this being in particular under the temperature and pH conditions used in the oil extraction field. The compositions thereof may be modulated according to the temperature and/or the pH of the desired application medium. Typically, the microgels based on monomer (mR2) are particularly heat stable and they may be used at high temperature, namely typically above 100° C., or even above 150° C.

Thus, the invention provides access to heat-stable aqueous microgels that are easy to prepare and to handle.

Given the heat stability of the polymer compositions according to the invention, it is not necessary to adjust the degree of crosslinking in order to ensure a sufficient fluid loss control effect as a function of the working temperature (in particular with increased temperature), unlike the microgels described in US 2010/0256018. The microgels of the invention are usable over a wide temperature range without having to adjust the compositions thereof.

Furthermore, the process of the invention which starts from a macrogel makes it possible to obtain, as required, high concentrations of particles in the microgel.

According to another aspect, the invention relates to the polymers (macrogels) resulting from step (E), the particles resulting from step (E2) and the microgels resulting from the dispersion of these particles in water.

The aqueous medium (M) used in step (E) is a medium comprising water, preferably in a proportion of at least 50% by weight, or even at least 80%, for example at least 90%, or even at least 95% by weight relative to the total weight of the aqueous medium. This aqueous medium may optionally comprise solvents other than water, for example a water-miscible alcohol. Thus, the medium (M) may be, for example, an aqueous-alcoholic mixture. According to one possible variant, the medium (M) may comprise other solvents, preferably in a concentration in which said solvent is water-miscible, which may especially make it possible to reduce the amount of stabilizing surfactants used. Thus, for example, the medium (M) may comprise pentanol, or any other additive for adjusting the aggregation number of the surfactants. In general, it is preferable for the medium (M) to be a continuous phase of water consisting of one or more solvents and/or additives that are miscible with each other and in water in the concentrations at which they are used.

Generally, the concentration of monomers (mR) is from 100 to 10 000 ppm (parts per million by weight) by weight relative to the total weight of all the monomers present in the medium (E). Preferably, the monomers (mR) are used in a concentration of from 100 to 1000 ppm, preferably from 200 to 600 ppm, for example from 300 to 500 ppm, by weight relative to the total weight of all the monomers present in the medium (E).

Typically, the mole ratio (mR)/(m1), which corresponds to the amount of crosslinking monomers (mR) relative to the total amount of hydrophilic monomers, is between 0.01 and 0.1%.

According to a preferred embodiment, the polymers used according to the invention are polymers as obtained according to a micellar radical polymerization step (E) which is specifically a radical polymerization of controlled type, namely carried out in the presence of an agent for control of the radical polymerization. For the purposes of the present description, the term "radical polymerization control agent" (or more simply "control agent") is intended to mean a compound capable of lengthening the lifetime of the growing polymer chains in a polymerization reaction and, preferably, of conferring, on the polymerization, a living or controlled nature.

When a radical polymerization control agent of the abovementioned type is used, in addition to the advantages related to the implementation of the micellar polymerization, it proves to be possible to control the average molecular weight of the polymers as obtained on conclusion of step (E): this weight may be controlled by the amount of control agent used (for a given amount of hydrophilic monomers, the weight generally decreases as this amount increases).

Thus, in the case where the step uses a radical polymerization control agent, the macrogels resulting from steps (E) have a controlled average molar mass.

The inventors have discovered that, under the conditions of step (E), despite the presence of crosslinking monomers and of micelles, the advantages of controlled radical polymerization are preserved, thereby thus making it possible to obtain crosslinked polymers which have a controlled average molar mass.

Typically, the polymers synthesized according to the process of the invention may have a molecular weight of greater than or equal to 300 000 g/mol. In particular, by adjusting the initial concentration of control agent within the medium (M), step (E) may typically lead to the synthesis of a block polymer having a molecular weight Mn of greater than or equal to 400 000 g/mol.

According to one advantageous embodiment of the process of the invention, in step (E), the initial concentration of control agent in the medium is chosen such that the average molecular weight of the synthesized polymer is a number-average molecular weight Mn of greater than or equal to 500 000 g/mol, for example greater than or equal to 1 000 000 g/mol, or greater than or equal to 2 000 000 g/mol, or even higher.

According to one possible embodiment, it is possible to use in step (E) a control agent which is a radical polymerization control agent of irreversible type, typically chosen from mercaptans, such as mercaptopropionic acid, thioglycolic acid or mercaptoethanol, primary or secondary alcohols, such as ethanol or isopropanol, or alternatively formic acid and its salts.

Alternatively, according to a particularly advantageous embodiment, the control agent used in step (E) is a reversible transfer agent as used in controlled radical polymerizations denoted under the terminology RAFT or MADIX, which typically use a reversible addition-fragmentation transfer process, such as those described, for example, in WO 96/30421, WO 98/01478, WO 99/35178, WO 98/58974, WO 00/75207, WO 01/42312, WO 99/35177, WO 99/31144, FR 2 794 464 or WO 02/26836.

When a reversible-type radical polymerization control agent is used, the polymers as obtained at the end of step (E) exhibit, in addition to the advantages related to the implementation of the micellar polymerization (namely, the control of the mole fraction of hydrophobic units in the polymers; and (ii) a control of the number of hydrophobic units in each hydrophobic block):
  a control of the average molecular weight (which may be finely controlled by the amount of control agent used: for a given amount of hydrophilic monomers, the weight decreases as this amount increases); and
  a control of the distribution of the hydrophobic blocks within the various chains;
  production of polymer chains of living nature, offering the possibility of preparing complex polymers of controlled architecture.

These advantages are very particularly pronounced when the radical polymerization control agent used is a compound which is soluble or dispersible in the aqueous medium (M) used in step (E), and/or when this control agent is not suitable for penetrating into the micelles of the micellar solution. This effect may also be observed in the case where the control agent is not soluble/dispersible in the medium (M) or when the control agent is suitable for penetrating into the micelles.

Thus, in the case where the step uses a reversible-type control agent, the macrogels resulting from step (E) have, in addition, a finely controlled average molar mass, and a homogeneity of the crosslinking point distribution which is in the microgel particles.

The inventors have discovered that these advantages linked to the use of a reversible control agent are preserved under the particular conditions of step (E), where it was not obvious that the presence of micelles and of crosslinking monomers would not disrupt the controlled radical polymerization mechanism.

According to one particular embodiment, the control agent used in step (E) may be a polymer chain resulting from a controlled radical polymerization and bearing a group that is capable of controlling a radical polymerization (polymer chain of "living" type, which is a type that is well known per se). Thus, for example, the control agent may be a polymer chain (preferably hydrophilic or water-dispersible) functionalized at the chain end by a xanthate group or more generally comprising an —SC=S— group, for example obtained according to the RAFT/MADIX technology.

Alternatively, the control agent used in step (E) is a nonpolymeric compound bearing a group which ensures control of the radical polymerization, in particular a thiocarbonylthio —S(C=S)— group.

According to an advantageous embodiment, the radical polymerization control agent used in step (E) is a compound which comprises a thiocarbonylthio group —S(C=S)—. Thus, for example, it may be a compound which comprises a xanthate group (bearing —SC=S—O— functions), for example a xanthate. Other types of control agent which are used in controlled radical polymerization may be envisaged (for example of the type of those used in CMP, in ATRP or in NMP).

The use of a control agent of step (E) of this type in the polymerization reaction makes it possible to finely control the size of the polymer chains and the molecular weight, and more particularly the degree of crosslinking, thereby making it possible to very finely and very precisely modulate the properties of the macrogel. It also induces a homogeneity in the macrogel synthesized, thereby making it possible to obtain, at the end of step (E2), particles which all have substantially the same compositions and properties.

According to a particular variant, the radical polymerization control agent used in step (E) is a polymer, advantageously an oligomer, of water-soluble or water-dispersible nature and bearing a thiocarbonylthio —S(C=S)— group, for example a xanthate —SC=S—O— group. This polymer, which is capable of acting both as a polymerization control agent and as a monomer in step (E), is also referred to as a "prepolymer" in the rest of the description. Typically, this prepolymer is obtained by radical polymerization of hydrophilic monomers in the presence of a control agent bearing a thiocarbonylthio —S(C=S)— group, for example a xanthate. Thus, for example, according to an advantageous embodiment which is illustrated at the end of the present description, the control agent used in step (E) may advantageously be a prepolymer bearing a thiocarbonylthio —S(C=S)— group, for example a xanthate —SC=S—O— group, obtained on conclusion of a controlled radical polymerization step ($E^0$) prior to step (E). In this step ($E^0$), hydrophilic monomers, advantageously identical to those used in step (E); a radical polymerization initiator; and a control agent bearing a thiocarbonylthio —S(C=S)— group, for example a xanthate, may typically be brought into contact.

The use of the abovementioned step (E⁰) prior to step (E) makes it possible, schematically, to hydrophilize a large number of control agents bearing thiocarbonylthio functions (for example xanthate, which are rather hydrophobic by nature), by converting them from prepolymers that are soluble or dispersible in the medium (M) of step (E).

Preferably, a prepolymer synthesized in step (E⁰) has a short polymer chain, for example comprising a sequence of less than 50 monomer units, or even less than 25 monomer units, for example between 2 and 15 monomer units.

According to a third aspect, a subject of the invention is also the particular use of the specific microgels obtained according to the invention.

Typically, the microgels obtained according to the present invention may be used in numerous applications in the oil industry. They may most particularly be used as rheological property modifiers, in particular as a thickener and/or as a suspending agent, in particular in aqueous media.

The microgels may also be used as a fluid loss control agent or a lost circulation control agent.

A subject of the invention is also processes for modifying aqueous media using these microgels as rheology modifiers.

The invention also relates to the aqueous compositions comprising the microgels according to the invention, which may in particular be used during hydrocarbon and exploration and production steps.

A subject of the invention is also the methods using aqueous compositions of this type for the exploration and/or exploitation of oil and/or gas deposits, in particular the methods using circulation or introduction of such a composition during the formation of wells (exploration) or during the exploitation thereof.

By way of example, the aqueous compositions of the invention may be used in a drilling fluid, a spacer fluid, a cement grout, a completion fluid, or else in a fracturing fluid, or a stimulation fluid or a conformance control fluid.

Various features and embodiments of the invention will now be described in greater detail.

The Radical Polymerization Control Agent

The control agent used in step (E) or, where appropriate, in step (E⁰) of the process of the invention is advantageously a compound bearing a thiocarbonylthio —S(C=S)— group. According to a particular embodiment, the control agent may bear several thiocarbonylthio groups. It may optionally be a polymer chain bearing such a group.

Thus, this control agent may, for example, correspond to the formula (A) below:

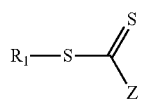

(A)

wherein:
Z represents:
  a hydrogen atom,
  a chlorine atom,
  an optionally substituted alkyl or optionally substituted aryl radical,
  an optionally substituted heterocycle,
  an optionally substituted alkylthio radical,
  an optionally substituted arylthio radical,
  an optionally substituted alkoxy radical,
  an optionally substituted aryloxy radical,
  an optionally substituted amino radical,
  an optionally substituted hydrazine radical,
  an optionally substituted alkoxycarbonyl radical,
  an optionally substituted aryloxycarbonyl radical,
  an optionally substituted acyloxy or carboxyl radical,
  an optionally substituted aroyloxy radical,
  an optionally substituted carbamoyl radical,
  a cyano radical,
  a dialkyl- or diarylphosphonato radical,
  a dialkyl-phosphinato or diaryl-phosphinato radical, or
  a polymer chain,
and
$R_1$ represents:
  an optionally substituted alkyl, acyl, aryl, aralkyl, alkene or alkyne group,
  a saturated or unsaturated, aromatic, optionally substituted carbocycle or heterocycle, or
  a polymer chain, which is preferably hydrophilic or water-dispersible when the agent is used in step (E).

The groups $R_1$ or Z, when they are substituted, may be substituted with optionally substituted phenyl groups, optionally substituted aromatic groups, saturated or unsaturated carbocycles, saturated or unsaturated heterocycles, or groups selected from the following: alkoxycarbonyl or aryloxycarbonyl (—COOR), carboxyl (—COOH), acyloxy (—O₂CR), carbamoyl (—CONR₂), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR₂), halogen, perfluoroalkyl $C_nF_{2n+1}$, allyl, epoxy, alkoxy (—OR), S-alkyl, S-aryl, groups having hydrophilic or ionic nature, such as alkaline salts of carboxylic acids, alkaline salts of sulfonic acid, polyalkylene oxide (PEO, PPO) chains, cationic substituents (quaternary ammonium salts), R representing an alkyl or aryl group, or a polymer chain.

For the control agents of formula (A) used in step (E), it is generally preferred for the group $R_1$ to be of hydrophilic nature. Advantageously, it is a water-soluble or water-dispersible polymer chain.

The group $R_1$ may alternatively be amphiphilic, namely may exhibit both a hydrophilic and lipophilic nature. It is preferable for $R_1$ not to be hydrophobic.

As regards the control agents of formula (A) used in step (E⁰), $R_1$ may typically be a substituted or unsubstituted, preferably substituted, alkyl group. A control agent of formula (A) used in step (E⁰) may nevertheless comprise other types of groups $R_1$, in particular a ring or a polymer chain.

The optionally substituted alkyl, acyl, aryl, aralkyl or alkyne groups generally contain from 1 to 20 carbon atoms, preferably from 1 to 12 and more preferentially from 1 to 9 carbon atoms. They may be linear or branched. They may also be substituted by oxygen atoms, in particular in the form of esters, sulfur atoms or nitrogen atoms.

Mention may in particular be made, among the alkyl radicals, of the methyl, ethyl, propyl, isopropyl, butyl, tert-butyl, pentyl, hexyl, octyl, decyl or dodecyl radical.

The alkyne groups are radicals generally of 2 to 10 carbon atoms; they exhibit at least one acetylenic unsaturation, such as the acetylenyl radical.

The acyl group is a radical generally exhibiting from 1 to 20 carbon atoms with a carbonyl group.

Mention may in particular be made, among the aryl radicals, of the phenyl radical, which is optionally substituted, in particular by a nitro or hydroxyl functional group.

Mention may in particular be made, among the aralkyl radicals, of the benzyl or phenethyl radical, which is optionally substituted, in particular by a nitro or hydroxyl functional group.

When $R_1$ or Z is a polymer chain, this polymer chain may result from a radical or ionic polymerization or result from a polycondensation.

Advantageously, use is made, as control agent for step (E) and also for step ($E^0$), where appropriate, of compounds bearing a xanthate —S(C=S)O—, trithiocarbonate, dithiocarbamate or dithiocarbazate function, for example bearing an O-ethyl xanthate function of formula —S(C=S)OCH$_2$CH$_3$.

When step ($E^0$) is performed, it is notably advantageous to use, as control agents in this step, a compound chosen from xanthates, trithiocarbonates, dithiocarbamates and dithiocarbazates. Xanthates prove to be most particularly advantageous, notably those bearing an O-ethyl xanthate —S(C=S)OCH$_2$CH$_3$ function, such as O-ethyl S-(1-(methoxycarbonyl)ethyl) xanthate (CH$_3$CH(CO$_2$CH$_3$))S(C=S)OEt. Another possible control agent in step ($E^0$) is dibenzyl trithiocarbonate of formula PhCH$_2$S(C=S)SCH$_2$Ph (where Ph=phenyl).

The living prepolymers obtained in step ($E^0$) by using the abovementioned control agents prove to be particularly advantageous for performing step (E).

Initiating and Performing of the Radical Polymerizations of Steps (E) and ($E^0$)

When it is used in step (E), the radical polymerization initiator is preferably water-soluble or water-dispersible. Besides this preferential condition, any radical polymerization initiator (source of free radicals) that is known per se and suited to the conditions chosen for these steps may be used in step (E) and step ($E^0$) of the process of the invention.

Thus, the radical polymerization initiator used according to the invention may be chosen, for example, from the initiators conventionally used in radical polymerization. It may, for example, be one of the following initiators:

hydrogen peroxides, such as: tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, potassium persulfate or ammonium persulfate, azo compounds, such as: 2,2'-azobis(isobutyronitrile), 2,2'-azobis(2-butanenitrile), 4,4'-azobis(4-pentanoic acid), 1,1'-azobis(cyclohexanecarbonitrile), 2-(t-butylazo)-2-cyanopropane, 2,2'-azobis[2-methyl-N-(1,1)-bis(hydroxymethyl)-2-hydroxyethyl]propionamide, 2,2'-azobis(2-methyl-N-hydroxyethyl]propionamide, 2,2'-azobis(N,N'-dimethyleneisobutyramidine) dichloride, 2,2'-azobis(2-amidinopropane) dichloride, 2,2'-azobis(N,N'-dimethyleneisobutyramide), 2,2'-azobis(2-methyl-N-[1,1-bis(hydroxymethyl)-2-hydroxyethyl]propionamide), 2,2'-azobis(2-methyl-N-[1,1-bis(hydroxymethyl)ethyl]propionamide), 2,2'-azobis[2-methyl-N-(2-hydroxyethyl)propionamide], 2,2'-azobis(isobutyramide) dihydrate.

Typically, the amount of initiator to be used is preferably determined so that the amount of radicals generated is at most 50 mol % and preferably at most 20 mol %, relative to the amount of control agent or transfer agent.

Most particularly, in step (E), it generally proves to be advantageous to use a radical initiator of redox type, which has, inter alia, the advantage of not requiring heating of the reaction medium (no thermal initiation) and for which the inventors have now also discovered that it proves to be suitable for the micellar polymerization of step (E).

Thus, the radical polymerization initiator used in step (E) may typically be a redox initiator, typically not requiring heating for its thermal initiation. It is typically a mixture of at least one oxidizing agent with at least one reducing agent.

The oxidizing agent present in this redox system is preferably a water-soluble agent. This oxidizing agent may be chosen, for example, from peroxides, such as: hydrogen peroxide, tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, sodium persulfate, potassium persulfate, ammonium persulfate or potassium bromate.

The reducing agent present in the redox system is also preferably a water-soluble agent. This reducing agent may typically be chosen from sodium formaldehyde sulfoxylate (notably in its dihydrate form, known under the name Rongalit, or in the form of an anhydride), ascorbic acid, erythorbic acid, sulfites, bisulfites or metasulfites (in particular alkali metal sulfites, bisulfites or metasulfites), nitrilotrispropionamides, and tertiary amines and ethanolamines (which are preferably water-soluble).

Possible redox systems comprise combinations such as:
mixtures of water-soluble persulfates with water-soluble tertiary amines,
mixtures of water-soluble bromates (for example, alkali metal bromates) with water-soluble sulfites (for example, alkali metal sulfites),
mixtures of hydrogen peroxide, alkyl peroxide, peresters, percarbonates and the like and of any of the iron salts, titanous salts, zinc formaldehyde sulfoxylate or sodium formaldehyde sulfoxylate, and reducing sugars,
alkali metal or ammonium persulfates, perborates or perchlorates in combination with an alkali metal bisulfite, such as sodium metabisulfite, and reducing sugars, and
alkali metal persulfates in combination with an arylphosphinic acid, such as benzenephosphonic acid and the like, and reducing sugars.

An advantageous redox system comprises (and preferably consists of) the combination of ammonium persulfate and sodium formaldehyde sulfoxylate.

Generally, and in particular in the case of the use of a redox system of the ammonium persulfate/sodium formaldehyde sulfoxylate type, it proves to be preferable for the reaction medium of step (E) to be free of copper. In the case of the presence of copper, it is generally desirable to add a copper-complexing agent, such as EDTA, in an amount that is capable of masking its presence.

Irrespective of the nature of the initiator used, the radical polymerization of step) ($E^0$) may be performed in any appropriate physical form, for example in solution in water or in a solvent, for example an alcohol or THF, in emulsion in water ("latex" process) or in bulk, where appropriate while controlling the temperature and/or the pH in order to render species liquid and/or soluble or insoluble.

After performing step (E), given the use of a control agent, polymers functionalized with transfer groups (living polymers) are obtained. This living nature makes it possible, if desired, to use these polymers in a subsequent polymerization reaction, according to a technique well known per se. Alternatively, if required, it is possible to deactivate or to destroy the transfer groups, for example by hydrolysis, ozonolysis or reaction with amines, according to means known per se. Thus, according to a particular embodiment, the process of the invention may comprise, after step (E), a step (E1) of hydrolysis, of ozonolysis or of reaction with amines which is capable of deactivating and/or destroying all or a portion of the transfer groups present on the polymer prepared in step (E).

The Hydrophilic Monomers (m1)

The process of the invention may be used with a very large number of hydrophilic monomers (m1) including monomers of non-crosslinking type (m'1) and optionally crosslinking monomers (mR1).

By way of non-crosslinking monomers (m1), mention may be in particular made of the monomers (m1) chosen from:
  ethylenically unsaturated carboxylic acids, sulfonic acids and phosphonic acids, and/or derivatives thereof such as acrylic acid (AA), methacrylic acid, ethacrylic acid, α-chloroacrylic acid, crotonic acid, maleic acid, maleic anhydride, itaconic acid, citraconic acid, mesaconic acid, glutaconic acid, aconitic acid, fumaric acid, monoethylenically unsaturated dicarboxylic acid monoesters comprising 1 to 3 and preferably 1 to 2 carbon atoms, for example monomethyl maleate, vinylsulfonic acid, (meth)allylsulfonic acid, sulfoethyl acrylate, sulfoethyl methacrylate, sulfopropyl acrylate, sulfopropyl methacrylate, 2-hydroxy-3-acryloyloxy-propylsulfonic acid, 2-hydroxy-3-methacryloyloxypropylsulfonic acid, styrenesulfonic acids, 2-acrylamido-2-methylpropanesulfonic acid, vinylphosphonic acid, α-methyl vinylphosphonic acid and allylphosphonic acid;
    esters of α,β-ethylenically unsaturated mono- and dicarboxylic acids with $C_2$-$C_3$ alkanediols, for example 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate and polyalkylene glycol (meth)acrylates;
  α,β-ethylenically unsaturated monocarboxylic acid amides and the N-alkyl and N,N-dialkyl derivatives thereof, such as acrylamide, methacrylamide, N-methyl(meth)acrylamide, N-ethyl(meth)acrylamide, N-propyl(meth)acrylamide, N,N-dimethyl(meth)acrylamide, N,N-diethyl(meth)acrylamide, morpholinyl(meth)acrylamide, and metholylacrylamide (acrylamide and N,N-dimethyl(meth)acrylamide prove to be especially advantageous);
  N-vinyllactams and derivatives thereof, for example N-vinylpyrrolidone and N-vinylpiperidone;
  open-chain N-vinylamide compounds, for example N-vinylformamide, N-vinyl-N-methylformamide, N-vinylacetamide, N-vinyl-N-methylacetamide, N-vinyl-N-ethylacetamide, N-vinylpropionamide, N-vinyl-N-methylpropionamide and N-vinylbutyramide;
    esters of α,β-ethylenically unsaturated mono- and dicarboxylic acids with aminoalcohols, for example N,N-dimethylaminomethyl (meth)acrylate, N,N-dimethylaminoethyl (meth)acrylate, N,N-diethylaminoethyl acrylate and N,N-dimethylaminopropyl (meth)acrylate;
    amides of α,β-ethylenically unsaturated monocarboxylic and dicarboxylic acids with diamines comprising at least one primary or secondary amino group, such as N-[2-(dimethylamino)ethyl]acrylamide, N[2-(dimethylamino)ethyl]methacrylamide, N-[3-(dimethylamino)propyl]acrylamide and N-[3-(dimethylamino)propyl]methacrylamide;
  nitrogenous heterocycles substituted with vinyl and allyl, for example N-vinylimidazole, N-vinyl-2-methylimidazole, heteroaromatic compounds substituted with vinyl and allyl, for example 2- and 4-vinylpyridine, 2- and 4-allylpyridine, and salts thereof;
  acrylamidosulfobetaines; and
    the mixtures and combinations of two or more of the abovementioned monomers.

According to a particular embodiment, these monomers may notably comprise acrylic acid (AA). According to a possible embodiment, the monomers are all acrylic acids, but it may also be envisioned to use as monomers a mixture comprising, inter alia, acrylic acid as a mixture with other hydrophilic monomers.

The monomers containing acid groups may be used for the polymerization in the form of the free acid or in partially or totally neutralized form. KOH, NaOH, ammonia or another base may be used, for example, for the neutralization.

According to another particular embodiment, the monomers used in the process of the invention are especially acrylic acid, methacrylic acid and/or salts thereof, and/or mixtures thereof.

According to another embodiment, the monomers (m1) used in step (E) comprise (and are typically formed of) (meth)acrylamide monomers, or more generally (meth)acrylamido monomers, including:
  acrylamido monomers, namely acrylamide, the sulfonate derivative thereof (AMPS), the quaternary ammonium (APTAC) and sulfopropyl dimethylammonium propyl acrylamide;
  methacrylamido monomers, such as sulfopropyldimethylammoniopropylmethacrylamide (SPP) or sulfohydroxypropyldimethylammoniopropylmethacrylamido.

According to one specific embodiment, the monomers m1 of step (E) are acrylamides. An acrylamide used in step (E) is preferably an acrylamide that is not stabilized with copper. In the event of copper being present, it is preferable to introduce a copper-complexing agent such as EDTA, where appropriate preferably to a proportion of 20 to 2000 ppm. When acrylamides are used in step (E), they may typically be used in the form of powder or of an aqueous solution (optionally, but not necessarily, stabilized with hydroquinone monomethyl ether HQME, or alternatively with copper salts (preferably supplemented with EDTA, where appropriate)).

Typically, the initial monomer (m1) concentration in the reaction medium of step (E) may range up to 40% by weight, indeed even up to 50% by weight, this concentration generally remaining less than 30% by weight, relative to the total weight of the reaction medium. For example, the initial monomer (m1) concentration in the reaction medium of step (E) is between 0.5% and 35% and in particular between 1% and 20% by weight, relative to the total weight of the reaction medium.

According to a specific embodiment, the hydrophilic monomers used in step (E) are heat-sensitive macromonomers, which are insoluble in water beyond a certain temperature (the cloud point), but are soluble at lower temperature, step (E) being performed at a temperature below the cloud point temperature. Macromonomers of this type typically have a polymerizable function of acrylamido type, and a side chain composed of ethylene oxide or propylene oxide sequences (random or in blocks), or alternatively based on N-isopropylacrylamide or N-vinylcaprolactam. This embodiment notably gives access to the preparation of polymers having heat-thickening properties, which may be used, for example, in the oil industry.

The hydrophilic crosslinking monomers (mR1) may be chosen from N,N'-methylenebisacrylamide (MBA), N,N'-ethylenebisacrylamide, polyethylene glycol (PEG) diacrylate, triacrylate, divinyl ether, typically trifunctional divinyl ether, for example tri(ethylene glycol) divinyl ether (TEGDE), N-diallylamines, N,N-diallyl-N-alkylamines, the acid addition salts thereof and the quaternization products thereof, the alkyl used here being preferentially ($C_1$-$C_3$)-alkyl; compounds of N,N-diallyl-N-methylamine and of N,N-diallyl-N,N-dimethylammonium, for example the chlorides and bromides; or alternatively ethoxylated trimethylolpropane triacylate, ditrimethylolpropane tetraacrylate (DiTMPTTA).

According to one advantageous embodiment, the hydrophilic crosslinking monomers (mR1) are chosen from N,N'-methylenebisacrylamide (MBA), polyethylene glycol (PEG) diacrylate, triacrylate, divinyl ether, and derivatives thereof.

The Hydrophobic Monomers (m2)

These monomers, used in step (E) in the form of a micellar solution, i.e. containing, in dispersed form in the medium (M), micelles comprising these hydrophobic monomers. Provided that they may be incorporated into micelles of this type, any monomer of hydrophobic nature may be envisioned in step (E).

These hydrophobic monomers typically have a solubility of less than 1000 ppm, for example less than 500 ppm, or even less than 100 ppm, in the reaction medium at the temperature at which step (E) is carried out.

The hydrophobic monomers (m2) may include monomers of non-crosslinking type (m'2) and/or crosslinking monomers (mR2).

By way of non-crosslinking hydrophobic monomers (m'2), mention may particularly made of:
  vinylaromatic monomers, such as styrene, α-methylstyrene, para-chloromethylstyrene, vinyltoluene, 2-methylstyrene, 4-methylstyrene, 2-(n-butyl)styrene, 4-(n-decyl)styrene or 2-(tert-butyl)styrene;
  halogenated vinyl compounds, such as vinyl or vinylidene halides, for example vinyl or vinylidene chlorides or fluorides, corresponding to the formula $R_bR_cC=CX^1X^2$,
    wherein: $X^1$=F or Cl
    $X^2$=H, F or Cl each one of $R_b$ and $FI_c$ represents, independently:
      H, Cl, F; or
      an alkyl group, preferably chlorinated and/or fluorinated, more advantageously perchlorinated or perfluorinated;
  esters of α,β-ethylenically unsaturated mono- or dicarboxylic acid with $C_2$-$C_{30}$ alkanols, for example methyl ethacrylate, ethyl (meth)acrylate, ethyl ethacrylate, n-propyl (meth)acrylate, isopropyl (meth)acrylate, n-butyl (meth)acrylate, sec-butyl (meth)acrylate, tert-butyl (meth)acrylate, tert-butyl ethacrylate, n-hexyl (meth)acrylate, n-heptyl (meth)acrylate, n-octyl (meth)acrylate, 1,1,3,3-tetramethylbutyl (meth)acrylate, ethylhexyl (meth)acrylate, n-nonyl (meth)acrylate, n-decyl (meth)acrylate, n-undecyl (meth)acrylate, tridecyl (meth)acrylate, myristyl (meth)acrylate, pentadecyl (meth)acrylate, palmityl (meth)acrylate, heptadecyl (meth)acrylate, nonadecyl (meth)acrylate, arachidyl (meth)acrylate, behenyl (meth)acrylate, lignoceryl (meth)acrylate, cerotinyl (meth)acrylate, melissinyl (meth)acrylate, palmitoleoyl (meth)acrylate, oleyl (meth)acrylate, linoleyl (meth)acrylate, linolenyl (meth)acrylate, stearyl (meth)acrylate, lauryl (meth)acrylate and mixtures thereof;
  esters of vinyl or allyl alcohol with $C_1$-$C_{30}$ monocarboxylic acids, for example vinyl formate, vinyl acetate, vinyl propionate, vinyl butyrate, vinyl laurate, vinyl stearate, vinyl propionate, vinyl versatate and mixtures thereof;
  ethylenically unsaturated nitriles, such as acrylonitrile or methacrylonitrile, and mixtures thereof;
  esters of α,β-ethylenically unsaturated monocarboxylic and dicarboxylic acids with $C_3$-$C_{30}$ alkanediols, for example 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate and 3-hydroxy-2-ethylhexyl methacrylate;
  primary amides of α,β-ethylenically unsaturated mono- and dicarboxylic acids and N-alkyl and N,N-dialkyl derivatives, such as N-propyl(meth)acrylamide, N-(n-butyl)(meth)acrylamide, N-(tert-butyl)(meth)acrylamide, N-(n-octyl)(meth)acrylamide, N-(1,1,3,3-tetramethylbutyl)(meth)acrylamide, N-ethylhexyl(meth)acrylamide, N-(n-nonyl)(meth)acrylamide, N-(n-decyl)(meth)acrylamide, N-(n-undecyl)(meth)acrylamide, N-tridecyl(meth)acrylamide, N-myristyl(meth)acrylamide, N-pentadecyl(meth)acrylamide, N-palmityl(meth)acrylamide, N-heptadecyl(meth)acrylamide, N-nonadecyl(meth)acrylamide, N-arachidyl(meth)acrylamide, N-behenyl(meth)acrylamide, N-lignoceryl(meth)acrylamide, N-cerotinyl(meth)acrylamide, N-melissinyl(meth)acrylamide, N-palmitoleoyl(meth)acrylamide, N-oleyl(meth)acrylamide, N-linoleyl(meth)acrylamide, N-linolenyl(meth)acrylamide, N-stearyl(meth)acrylamide and N-lauryl(meth)acrylamide;
  N-vinyllactams and derivatives thereof, such as N-vinyl-5-ethyl-2-pyrrolidone, N-vinyl-6-methyl-2-piperidone, N-vinyl-6-ethyl-2-piperidone, N-vinyl-7-methyl-2-caprolactam and N-vinyl-7-ethyl-2-caprolactam;
  esters of α,β-ethylenically unsaturated mono- and dicarboxylic acids with aminoalcohols, for example N,N-dimethylaminocyclohexyl (meth)acrylate; and
  amides of α,β-ethylenically unsaturated monocarboxylic and dicarboxylic acids with diamines comprising at least one primary or secondary amino group, for example N-[4-(dimethylamino)butyl](meth)acrylamide and N-[4-(dimethylamino)cyclohexyl](meth)acrylamide.

According to one preferential embodiment, the no crosslinking hydrophobic monomers (m'2) used according to the invention may be chosen from:
  $C_1$-$C_{30}$ alkyl and preferably $C_4$-$C_{22}$ alkyl α,β-unsaturated esters, in particular alkyl acrylates and methacrylates, such as methyl, ethyl, butyl, 2-ethylhexyl, isooctyl, lauryl, isodecyl or stearyl acrylates and methacrylates (lauryl methacrylate in particular proves to be notably advantageous);
  $C_1$-$C_{30}$ alkyl and preferably $C_4$-$C_{22}$ alkyl α,β-unsaturated amides, in particular alkylacrylamides and alkylmethacrylamides, such as methyl, ethyl, butyl, 2-ethylhexyl, isooctyl, lauryl, isodecyl or stearylacrylamide or methacrylamide (laurylmethacrylamide in particular proves to be especially advantageous);

vinyl or allyl alcohol esters of saturated carboxylic acids, such as vinyl or allyl acetate, propionate, versatate or stearate;

α,β-unsaturated nitriles containing from 3 to 12 carbon atoms, such as acrylonitrile or methacrylonitrile; and the mixtures and combinations of two or more of the abovementioned monomers.

According to one particular embodiment, the non-crosslinking hydrophobic monomers (m'2) are chosen from: $C_1$-$C_{30}$ alkyl and preferably $C_4$-$C_{22}$ alkyl α,β-unsaturated esters, in particular alkyl acrylates and methacrylates, such as methyl, ethyl, butyl, 2-ethylhexyl, isooctyl, lauryl, isodecyl or stearyl acrylates and methacrylates (lauryl methacrylate in particular proves to be particularly advantageous);

The hydrophobic crosslinking monomers (mR2) may be chosen from divinylbenzene (DVB), ethoxylated or propoxylated bisphenol A diacrylate, dipropylene glycol diacrylate (DPGDA), tripropylene glycol diacrylate (TPGDA), propoxylated di(meth)acrylate, butyloxylated di(meth)acrylate, dimethylacrylamide, 1, 4-butanediol dimethacrylate (BDDMA), 1,6-hexanediol dimethacrylate (HDDMA), 1,3-butylene glycol dimethacrylate (BGDMA), and derivatives thereof.

According to one advantageous embodiment, the hydrophobic crosslinking monomers (mR2) are chosen from divinylbenzene (DVB), and derivatives thereof.

Surfactants

Use may be made, in order to prepare the micellar solution of the hydrophobic monomers which are used in step (E), of any suitable surfactant in a nonlimiting manner; use may be made, for example, of the surfactants chosen from the following list:

The anionic surfactants may be chosen from:
alkyl ester sulfonates, for example of formula R—CH($SO_3M$)-$CH_2$COOR', or alkyl ester sulfates, for example of formula R—CH($OSO_3M$)-$CH_2$COOR', where R represents a $C_8$-$C_{20}$ and preferably $C_{10}$-$C_{16}$ alkyl radical, R' represents a $C_1$-$C_6$ and preferably $C_1$-$C_3$ alkyl radical and M represents an alkaline earth metal cation, for example the sodium cation, or the ammonium cation. Mention may very particularly be made of methyl ester sulfonates, the R radical of which is a $C_{14}$-$C_{16}$ radical; alkylbenzenesulfonates, more particularly $C_9$-$C_{20}$ alkylbenzenesulfonates, primary or secondary alkylsulfonates, in particular $C_8$-$C_{22}$ alkylsulfonates, or alkylglycerolsulfonates;
alkyl sulfates, for example of formula $ROSO_3M$, where R represents a $C_{10}$-$C_{24}$ and preferably $C_{12}$-$C_{20}$ alkyl or hydroxyalkyl radical and M represents a cation having the same definition as above, for example sodium dodecyl sulpfate (SDS);
alkyl ether sulfates, for example of formula RO(OA)$_n$$SO_3M$, where R represents a $C_{10}$-$C_{24}$ and preferably $C_{12}$-$C_{20}$ alkyl or hydroxyalkyl radical, OA represents an ethoxylated and/or propoxylated group, M represents a cation having the same definition as above and n generally varies from 1 to 4, such as, for example, lauryl ether sulfate with n=2;
alkylamide sulfates, for example of formula RCONHR'$OSO_3M$, where R represents a $C_2$-$C_{22}$ and preferably $C_6$-$C_{20}$ alkyl radical, R' represents a $C_2$-$C_3$ alkyl radical and represents a cation with the same definition as above, and also their polyalkoxylated (ethoxylated and/or propoxylated) derivatives (alkylamide ether sulfates);
salts of saturated or unsaturated fatty acids, for example such as $C_8$-$C_{24}$ and preferably $C_{14}$-$C_{20}$ fatty acids, and of an alkaline earth metal cation, N-acyl-N-alkyltaurates, alkylisethionates, alkylsuccinamates and alkyl sulfosuccinates, alkylglutamates, monoesters or diesters of sulfosuccinates, N-acylsarcosinates or polyethoxycarboxylates;
mono- and diester phosphates, for example having the following formula: $(RO)_x$—P(=O)$(OM)_{x'}$, where R represents an optionally polyalkoxylated alkyl, alkylaryl, arylalkyl or aryl radical, x and x' are equal to 1 or 2, provided that the sum of x and x' is equal to 3, and M represents an alkaline earth metal cation;

The nonionic surfactants may be chosen from:
alkoxylated fatty alcohols, for example laureth-2, laureth-4, laureth-7 or oleth-20, alkoxylated triglycerides, alkoxylated fatty acids, alkoxylated sorbitan esters, alkoxylated fatty amines, alkoxylated di(1-phenylethyl)phenols, alkoxylated tri(1-phenylethyl)phenols, alkoxylated alkylphenols, the products resulting from the condensation of ethylene oxide with a hydrophobic compound resulting from the condensation of propylene oxide with propylene glycol, such as the Pluronic products sold by BASF, the products resulting from the condensation of ethylene oxide the compound resulting from the condensation of propylene oxide with ethylenediamine, such as the Tetronic products sold by BASF, alkylpolyglycosides, such as those described in U.S. Pat. No. 4,565,647, or alkylglucosides, or fatty acid amides, for example $C_8$-$C_{20}$ fatty acid amides, in particular fatty acid monoalkanolamides, for example cocamide MEA or cocamide MIPA;

The amphoteric surfactants (true amphoteric species comprising an ionic group and a potentially ionic group of opposite charge, or zwitterionic species simultaneously comprising two opposite charges) may be: betaines generally, in particular carboxybetaines, for example lauryl betaine (Mirataine BB from Rhodia) or octyl betaine or cocoyl betaine (Mirataine BB-FLA from Rhodia); amidoalkyl betaines, such as cocamidopropyl betaine (CAPB) (Mirataine BDJ from Rhodia or Mirataine BET C-30 from Rhodia);
sulfobetaines or sultaines, such as cocamidopropyl hydroxysultaine (Mirataine CBS from Rhodia);
alkylamphoacetates and alkylamphodiacetates, such as, for example, comprising a cocoyl or lauryl chain (Miranol C2M Conc. NP, C32, L32 in particular, from Rhodia);
alkylamphopropionates or alkylamphodipropionates (Miranol C2M SF);
alkyl amphohydroxypropyl sultaines (Miranol CS);
alkylamine oxides, for example lauramine oxide (INCI); (carboxylatomethyl)hexadecyl dimethylammonium (Mackam CET from the company Solvay);

The cationic surfactants may be optionally polyethoxylated primary, secondary or tertiary fatty amine salts, quaternary ammonium salts, such as tetraalkylammonium, alkylamidoalkylammonium, trialkylbenzylammonium, trialkylhydroxyalkylammonium or alkylpyridinium chlorides or bromides, imidazoline derivatives or amine oxides of cationic nature. An example of a cationic surfactant is cetrimonium chloride or bromide (INCI);

The surfactants used according to the present invention may be block copolymers comprising at least one hydrophilic block and at least one hydrophobic block different from the hydrophilic block, which are advantageously obtained according to a polymerization process wherein:
- (a₀) at least one hydrophilic (or, respectively, hydrophobic) monomer, at least one source of free radicals and at least one radical polymerization control agent of the —S(C=S)— type are brought into contact in an aqueous phase;
- (a₁) the polymer obtained on conclusion of step (a₀) is brought into contact with at least one hydrophobic (respectively hydrophilic) monomer different from the monomer used in step (a₀) and at least one source of free radicals;

via which a diblock copolymer is obtained.

Polymers of the triblock type, or comprising more blocks, may optionally be obtained by carrying out, after step (a₁), a step (a₂) wherein the polymer obtained on conclusion of step (a₁) is brought into contact with at least one monomer different from the monomer used in step (a₁) and at least one source of free radicals; and more generally by carrying out (n+1) steps of the type of the abovementioned steps (a₁) and (a₂) and n is an integer typically ranging from 1 to 3, where, in each step ($a_n$), with n≥1, with the polymer obtained on conclusion of step ($a_{n-1}$) is brought into contact with at least one monomer different from the monomer used in step ($a_{n-1}$) and at least one source of free radicals. Use may be made, for example, according to the invention, of the copolymers of the type which are described in WO 03/068827, WO 03/068848 and WO 2005/021612.

Use of the Microgels of the Invention

The microgels of the present invention may be used within an underground formation, for regulating the rheology in the field of oil and natural gas exploration and production. They may in particular be used for the formation of drilling fluids, cementing fluids, completion fluids, spacer fluids, lost circulation pill fluids, for fracturing, for stimulation, acidification, conformance control and for enhanced oil recovery.

They may be for example used as suspending agents or as an agent for providing a fluid loss control effect in fluids injected under pressure into underground formations.

In one embodiment, the microgels may be used to absorb water, in particular as superabsorbents (they may contain more than 99% water).

Various aspects and advantages of the invention will be further illustrated by the examples below, in which polymers were prepared according to the process of the invention.

EXAMPLES

Example 1

Synthesis of the Polymer Gels: Step E (counterexample) The polymer P1 (poly AM/DMA/AMPS/Xa) with an intended molar mass of 2 000 000 g/mol was prepared under the following conditions:
521.4 g of acrylamide (AM) in solution at 50% by weight in water, 550.5 g of AMPS in solution at 50% by weight in water, 123.4 g of dimethylacrylamide (DMA) and 983.1 g of demineralized water were weighed out in a 2000 ml glass bottle. After stirring the previously prepared solution with the magnetic bar, the pH is measured using a calibrated pH meter; the pH of the solution was 9.9; it was adjusted to 6.0 using a 10% by weight solution of sulfuric acid in water. 6.87 g of a 1% by weight solution of Rhodixan A1 in ethanol are then added. This new solution was charged to a Dewar flask (3000 ml) equipped with a cap which makes possible an atmospheric airtightness, an anchor stirrer, a temperature probe and a nitrogen inlet, at ambient temperature (20° C.). The mixture was degassed by bubbling with nitrogen and stirred for 60 minutes. 0.33 g of 2,2'-azobis(2-methylpropionamidine) dihydrochloride, 11.0 g of potassium persulfate (KPS) (aqueous solution at 4% by weight) and 4.4 g of sodium formaldehyde sulfoxylate, in the form of aqueous solution at 5% by weight, were added to the medium, all at once. The KPS solution was degassed beforehand by bubbling with nitrogen for 15 minutes. The polymerization reaction was then allowed to take place without stirring for 16 hours.

(counterexample) The polymer P2 (poly AM/DMA/AMPS/MBA/Xa) containing 3 hydrophilic crosslinking units per chain with an intended molar mass of 2 000 000 g/mol was prepared under the following conditions:
521.4 g of acrylamide in solution at 50% by weight in water, 550.5 g of AMPS in solution at 50% by weight in water, 123.4 g of dimethylacrylamide (DMA), 15.3 g of a solution of methylenebisacrylamide (MBA) at 5% by weight in water and 967.8 g of demineralized water were weighed out in a 2000 ml glass bottle. After stirring the previously prepared solution with the magnetic bar, the pH is measured using a calibrated pH meter; the pH of the solution was 10.0; it was adjusted to 6.0 using a 10% by weight solution of sulfuric acid in water. 6.87 g of a 1% by weight solution of Rhodixan A1 in ethanol are then added. This new solution was charged to a Dewar flask (3000 ml) equipped with a cap which makes possible an atmospheric airtightness, an anchor stirrer, a temperature probe and a nitrogen inlet, at ambient temperature (20° C.). The mixture was degassed by bubbling with nitrogen and stirred for 60 minutes. 0.33 g of 2,2'-azobis(2-methylpropionamidine) dihydrochloride, 11.0 g of potassium persulfate (KPS) (aqueous solution at 4% by weight) and 4.4 g of sodium formaldehyde sulfoxylate, in the form of aqueous solution at 5% by weight, were added to the medium, all at once. The KPS solution was degassed beforehand by bubbling with nitrogen for 15 minutes. The polymerization reaction was then allowed to take place without stirring for 16 hours.

(counterexample) The polymer P3 (poly AM/DMA/AMPS/TEGDE/Xa) containing 6 hydrophilic crosslinking units per chain with an intended molar mass of 2 000 000 g/mol was prepared under the following conditions:
521.5 g of acrylamide in solution at 50% by weight in water, 550.8 g of AMPS in solution at 50% by weight in water, 123.4 g of dimethylacrylamide (DMA), 0.2 g of tri(ethylene glycol) divinyl ether (TEGDE) and 989.8 g of demineralized water were weighed out in a 2000 ml glass bottle. After stirring the previously prepared solution with the magnetic bar, the pH is measured using a calibrated pH meter; the pH of the solution was 9.9; it was adjusted to 6.0 using a 10% by weight solution of sulfuric acid in water. 6.86 g of a 1% by weight solution of Rhodixan A1 in ethanol are then added. This new solution was charged to a Dewar flask (3000 ml) equipped with a cap which makes possible an atmospheric airtightness, an anchor stirrer, a temperature probe and a nitrogen inlet, at ambient temperature (20° C.). The mixture was degassed by bubbling with nitrogen and stirred for 60 minutes. 3.3 g of an aqueous solution of 2,2'-azobis(2-methylpropionamidine) dihydrochloride at 10% by weight, 4.4 g of sodium persulfate (NaPS) (aqueous solution at 10% by weight) and 2.2 g of sodium formaldehyde sulfoxylate, in the form of aqueous solution at 10% by weight, were added to the medium, all at once. The NaPS solution was degassed beforehand by bubbling with nitrogen for 15 minutes. The polymerization reaction was then allowed to take place without stirring for 16 hours.

(counterexample) The polymer P4 (poly AM/DMA/AMPS/styrene/Xa) containing 3 hydrophobic units per chain with an intended molar mass of 2 000 000 g/mol was prepared under the following conditions:

15.4 g of Stepanol WA Extra, 0.11 g of styrene and 6.7 g of demineralized water were introduced, at ambient temperature (20° C.), into a 2000 ml glass bottle. The mixture was left to stir using a magnetic bar for 60 min until the styrene had completely dissolved. 520.7 g of acrylamide in solution at 50% by weight in water, 558.7 g of AMPS in solution at 50% by weight in water, 122.8 g of dimethylacrylamide (DMA) and 962.2 g of demineralized water were weighed out in this same 2000 ml glass bottle. After stirring the solution with the magnetic bar, the pH is measured using a calibrated pH meter; the pH of the solution was 9.8; it was adjusted to 6.0 using a 10% by weight solution of sulfuric acid in water. 6.97 g of a 1% by weight solution of Rhodixan A1 in ethanol are then added. This new solution was charged to a Dewar flask (3000 ml) equipped with a cap which makes possible an atmospheric airtightness, an anchor stirrer, a temperature probe and a nitrogen inlet, at ambient temperature (20° C.). The mixture was degassed by bubbling with nitrogen and stirred for 60 minutes. 3.3 g of an aqueous solution of 2,2'-azobis(2-methylpropionamidine) dihydrochloride at 10% by weight, 4.4 g of sodium persulfate (NaPS) (aqueous solution at 10% by weight) and 2.2 g of sodium formaldehyde sulfoxylate, in the form of aqueous solution at 10% by weight, were added to the medium, all at once. The NaPS solution was degassed beforehand by bubbling with nitrogen for 15 minutes. The polymerization reaction was then allowed to take place without stirring for 16 hours.

(counterexample) The polymer P5 (poly AM/DMA/AMPS/styrene/Xa) containing 4.5 hydrophobic units per chain with an intended molar mass of 2 000 000 g/mol was prepared under the following conditions:

23.0 g of Stepanol WA Extra, 0.16 g of styrene and 10.0 g of demineralized water were introduced, at ambient temperature (20° C.), into a 2000 ml glass bottle. The mixture was left to stir using a magnetic bar for 60 min until the styrene had completely dissolved. 156.9 g of acrylamide in solution at 50% by weight in water, 506.1 g of AMPS in solution at 50% by weight in water, 328.3 g of dimethylacrylamide (DMA) and 1159.2 g of demineralized water were weighed out in this same 2000 ml glass bottle. After stirring the solution with the magnetic bar, the pH is measured using a calibrated pH meter; the pH of the solution was 9.9; it was adjusted to 6.0 using a 10% by weight solution of sulfuric acid in water. 6.87 g of a 1% by weight solution of Rhodixan A1 in ethanol are then added. This new solution was charged to a Dewar flask (3000 ml) equipped with a cap which makes possible an atmospheric airtightness, an anchor stirrer, a temperature probe and a nitrogen inlet, at ambient temperature (20° C.). The mixture was degassed by bubbling with nitrogen and stirred for 60 minutes. 3.3 g of an aqueous solution of 2,2'-azobis(2-methylpropionamidine) dihydrochloride at 10% by weight, 4.4 g of sodium persulfate (NaPS) (aqueous solution at 10% by weight) and 2.2 g of sodium formaldehyde sulfoxylate, in the form of aqueous solution at 10% by weight, were added to the medium, all at once. The NaPS solution was degassed beforehand by bubbling with nitrogen for 15 minutes. The polymerization reaction was then allowed to take place without stirring for 16 hours.

The polymer P6 (poly AM/DMA/AMPS/DVB/Xa) containing 6 hydrophobic crosslinking units per chain with an intended molar mass of 2 000 000 g/mol was prepared under the following conditions:

15.4 g of Stepanol WA Extra, 0.17 g of divinylbenzene (DVB) at 80% purity and 6.6 g of demineralized water were introduced, at ambient temperature (20° C.), into a 2000 ml glass bottle. The mixture was left to stir using a magnetic bar for 60 min until the DVB had completely dissolved. 519.7 g of acrylamide in solution at 50% by weight in water, 558.6 g of AMPS in solution at 50% by weight in water, 120.8 g of dimethylacrylamide (DMA) and 962.2 g of demineralized water were weighed out in this same 2000 ml glass bottle. After stirring the solution with the magnetic bar, the pH is measured using a calibrated pH meter; the pH of the solution was 9.8; it was adjusted to 6.0 using a 10% by weight solution of sulfuric acid in water. 6.87 g of a 1% by weight solution of Rhodixan A1 in ethanol are then added. This new solution was charged to a Dewar flask (3000 ml) equipped with a cap which makes possible an atmospheric airtightness, an anchor stirrer, a temperature probe and a nitrogen inlet, at ambient temperature (20° C.). The mixture was degassed by bubbling with nitrogen and stirred for 60 minutes. 3.3 g of an aqueous solution of 2,2'-azobis(2-methylpropionamidine) dihydrochloride at 10% by weight, 4.4 g of sodium persulfate (NaPS) (aqueous solution at 10% by weight) and 2.2 g of sodium formaldehyde sulfoxylate, in the form of aqueous solution at 10% by weight, were added to the medium, all at once. The NaPS solution was degassed beforehand by bubbling with nitrogen for 15 minutes. The polymerization reaction was then allowed to take place without stirring for 16 hours.

The polymer P7 (poly AM/DMA/AMPS/DVB/Xa) containing 6 hydrophobic crosslinking units per chain with an intended molar mass of 2 000 000 g/mol was prepared under the following conditions:

15.4 g of Stepanol WA Extra, 0.17 g of divinylbenzene (DVB) at 80% purity and 6.6 g of demineralized water were introduced, at ambient temperature (20° C.), into a 2000 ml glass bottle. The mixture was left to stir using a magnetic bar for 60 min until the DVB had completely dissolved. 156.9 g of acrylamide in solution at 50% by weight in water, 506.1 g of AMPS in solution at 50% by weight in water, 328.4 g of dimethylacrylamide (DMA) and 1148.5 g of demineralized water were weighed out in this same 2000 ml glass bottle. After stirring the solution with the magnetic bar, the pH is measured using a calibrated pH meter; the pH of the solution was 9.8; it was adjusted to 6.0 using a 10% by weight solution of sulfuric acid in water. 6.87 g of a 1% by weight solution of Rhodixan A1 in ethanol are then added. This new solution was charged to a Dewar flask (3000 ml) equipped with a cap which makes possible an atmospheric airtightness, an anchor stirrer, a temperature probe and a nitrogen inlet, at ambient temperature (20° C.). The mixture was degassed by bubbling with nitrogen and stirred for 60 minutes. 3.3 g of an aqueous solution of 2,2'-azobis(2-methylpropionamidine) dihydrochloride at 10% by weight, 4.4 g of sodium persulfate (NaPS) (aqueous solution at 10% by weight) and 2.2 g of sodium formaldehyde sulfoxylate, in the form of aqueous solution at 10% by weight, were added to the medium, all at once. The NaPS solution was degassed beforehand by bubbling with nitrogen for 15 minutes. The polymerization reaction was then allowed to take place without stirring for 16 hours.

The polymer P8 (poly AM/DMA/AMPS/DVB/Xa) containing 12 hydrophobic crosslinking units per chain with an intended molar mass of 2 000 000 g/mol was prepared under the following conditions:

30.7 g of Stepanol WA Extra, 0.341 g of divinylbenzene (DVB) at 80% purity and 13.2 g of demineralized water were introduced, at ambient temperature (20° C.), into a 2000 ml glass bottle. The mixture was left to stir using a magnetic bar for 60 min until the DVB had completely dissolved. 156.9 g of acrylamide in solution at 50% by weight in water, 506.1 g of AMPS in solution at 50% by weight in water, 328.4 g of dimethylacrylamide (DMA) and 1148.5 g of demineralized water were weighed out in this same 2000 ml glass bottle. After stirring the solution with the magnetic bar, the pH is measured using a calibrated pH meter; the pH of the solution was 9.8; it was adjusted to 6.0 using a 10% by weight solution of sulfuric acid in water. 6.87 g of a 1% by weight solution of Rhodixan A1 in ethanol are then added. This new solution was charged to a Dewar flask (3000 ml) equipped with a cap which makes possible an atmospheric airtightness, an anchor stirrer, a temperature probe and a nitrogen inlet, at ambient temperature (20° C.). The mixture was degassed by bubbling with nitrogen and stirred for 60 minutes. 3.3 g of an aqueous solution of 2,2'-azobis(2-methylpropionamidine) dihydrochloride at 10% by weight, 4.4 g of sodium persulfate (NaPS) (aqueous solution at 10% by weight) and 2.2 g of sodium formaldehyde sulfoxylate, in the form of aqueous solution at 10% by weight, were added to the medium, all at once. The NaPS solution was degassed beforehand by bubbling with nitrogen for 15 minutes. The polymerization reaction was then allowed to take place without stirring for 16 hours.

The polymer P9 (poly AM/DMA/AMPS/LMA/MBA/Xa) containing 37 hydrophobic units per chain and 3 hydrophilic crosslinking units per chain, with an intended molar mass of 2 000 000 g/mol was prepared under the following conditions:

62.7 g of Stepanol WA Extra, 3.21 g of Lauryl acrylate (LMA) and 24.4 g of demineralized water were introduced, at ambient temperature (20° C.), into a 2000 ml glass bottle. The mixture was left to stir using a magnetic bar for 60 min until the LMA had completely dissolved. 517.4 g of acrylamide in solution at 50% by weight in water, 556.2 g of AMPS in solution at 50% by weight in water, 120.2 g of dimethylacrylamide (DMA), 3.8 g of a solution of methylenebisacrylamide (MBA) at 2% by weight in water and 895.7 g of demineralized water were weighed out in this same 2000 ml glass bottle. After stirring the solution with the magnetic bar, the pH is measured using a calibrated pH meter; the pH of the solution was 9.58; it was adjusted to 6.0 using a 10% by weight solution of sulfuric acid in water. 6.84 g of a 1% by weight solution of Rhodixan A1 in ethanol are then added. This new solution was charged to a Dewar flask (3000 ml) equipped with a cap which makes possible an atmospheric airtightness, an anchor stirrer, a temperature probe and a nitrogen inlet, at ambient temperature (20° C.). The mixture was degassed by bubbling with nitrogen and stirred for 60 minutes. 3.3 g of an aqueous solution of 2,2'-azobis(2-methylpropionamidine) dihydrochloride at 10% by weight, 14.7 g of potassium persulfate (KPS) (aqueous solution at 3% by weight) and 2.2 g of sodium formaldehyde sulfoxylate, in the form of aqueous solution at 10% by weight, were added to the medium, all at once. The NaPS solution was degassed beforehand by bubbling with nitrogen for 15 minutes. The polymerization reaction was then allowed to take place without stirring for 16 hours.

The polymer P10 (poly AM/DMA/AMPS/LMA/DVB/Xa) containing 18 hydrophobic units per chain and 6 hydrophobic crosslinking units per chain, with an intended molar mass of 2 000 000 g/mol was prepared under the following conditions:

28.5 g of Stepanol WA Extra, 0.346 g of divinylbenzene (DVB), 1.47 g of lauryl methacrylate (LMA) and 24.4 g of demineralized water were introduced, at ambient temperature (20° C.), into a 2000 ml glass bottle. The mixture was left to stir using a magnetic bar for 180 min until the LMA and DVB had completely dissolved. 156.6 g of acrylamide in solution at 50% by weight in water, 505.3 g of AMPS in solution at 50% by weight in water, 327.6 g of dimethylacrylamide (DMA) and 1145.3 g of demineralized water were weighed out in this same 2000 ml glass bottle. After stirring the solution with the magnetic bar, the pH is measured using a calibrated pH meter; the pH of the solution was 9.58; it was adjusted to 6.0 using a 10% by weight solution of sulfuric acid in water. 6.84 g of a 1% by weight solution of Rhodixan A1 in ethanol are then added. This new solution was charged to a Dewar flask (3000 ml) equipped with a cap which makes possible an atmospheric airtightness, an anchor stirrer, a temperature probe and a nitrogen inlet, at ambient temperature (20° C.). The mixture was degassed by bubbling with nitrogen and stirred for 60 minutes. 3.3 g of an aqueous solution of 2,2'-azobis(2-methylpropionamidine) dihydrochloride at 10% by weight, 14.7 g of potassium persulfate (KPS) (aqueous solution at 3% by weight) and 2.2 g of sodium formaldehyde sulfoxylate, in the form of aqueous solution at 10% by weight, were added to the medium, all at once. The NaPS solution was degassed beforehand by bubbling with nitrogen for 15 minutes. The polymerization reaction was then allowed to take place without stirring for 16 hours.

The polymer P11 (poly AM/DMA/AMPS/LMA/DVB/Xa) containing 37 hydrophobic units per chain and 6 hydrophobic crosslinking units per chain, with an intended molar mass of 2 000 000 g/mol was prepared under the following conditions:

56.9 g of Stepanol WA Extra, 0.33 g of divinylbenzene (DVB), 2.91 g of Lauryl acrylate (LMA) and 24.4 g of demineralized water were introduced, at ambient temperature (20° C.), into a 2000 ml glass bottle. The mixture was left to stir using a magnetic bar for 180 min until the LMA and DVB had completely dissolved. 156.6 g of acrylamide in solution at 50% by weight in water, 505.3 g of AMPS in solution at 50% by weight in water, 327.6 g of dimethylacrylamide (DMA) and 111.72 g of demineralized water were weighed out in this same 2000 ml glass bottle. After stirring the solution with the magnetic bar, the pH is measured using a calibrated pH meter; the pH of the solution was 9.58; it was adjusted to 6.0 using a 10% by weight solution of sulfuric acid in water. 6.84 g of a 1% by weight solution of Rhodixan A1 in ethanol are then added. This new solution was charged to a Dewar flask (3000 ml) equipped with a cap which makes possible an atmospheric airtightness, an anchor stirrer, a temperature probe and a nitrogen inlet, at ambient temperature (20° C.). The mixture was degassed by bubbling with nitrogen and stirred for 60 minutes. 3.3 g of an aqueous solution of 2,2'-azobis(2-methylpropionamidine) dihydrochloride at 10% by weight, 14.7 g of potassium persulfate (KPS) (aqueous solution at 3% by weight) and 2.2 g of sodium formaldehyde sulfoxylate, in the form of aqueous solution at 10% by weight, were added to the medium, all at once. The NaPS solution was degassed beforehand by bubbling with nitrogen for 15 minutes. The polymerization reaction was then allowed to take place without stirring for 16 hours.

Drying and Milling: Step E2

The polymer gels obtained according to the synthesis conditions described above are cut up and dried in a fluid bed or on a tray and then milled to obtain the microgels. The milling is carried out using an Alpine 160 pin mill. The particle sizes are determined by dry laser particle size analysis on a Malvern Mastersizer particle size analyzer.

| REF | mR1 (ppm) | mR2 (ppm) | m2 (ppm) | particle size (median diameter μm) |
|---|---|---|---|---|
| P1 | 0 | 0 | 0 | 57 |
| P2 | 116 | 0 | 0 | 45 |
| P3 | 303 | 0 | 0 | 47 |
| P4 | 0 | 0 | 166 | 59 |
| P5 | 0 | 0 | 242 | 60 |
| P6 | 0 | 258 | 0 | 57 |
| P7 | 0 | 258 | 0 | 96 |
| P8 | 0 | 515 | 0 | 40 |
| P9 | 116 | 0 | 4900 | 51 |
| P10 | 0 | 523 | 2235 | 24 |
| P11 | 0 | 502 | 4425 | 28 |

Example 2—Evaluation of Thermal Stability by Rheology at High Temperature

The thermal stability of the microgels is evaluated by direct measurement of their flow viscosity at a constant temperature of 176° C. A Chandler Engineering model 5550 pressurized rheometer equipped with a spindle of B05 type is used to monitor the change in viscosity of the suspensions of microgels over time at 176° C. and a constant shear of 100 s$^{-1}$. The study is carried out over a period of 3 to 4 hours which is representative of the typical use times in a drilling fluid, a spacer or cementing.

Firstly, 2% microgel suspensions are prepared in 2% potassium chloride alone, with stirring using a magnetic bar, and left to hydrate from 2 hours. At the time of introduction to the rheometer, 200 ppm of sodium metabisulfite are added to the solution as an oxygen scavenger in order to prevent the oxidative degradation phenomena not representative of the actual conditions of use.

| REF | counterexamples (viscosity) | | Example (viscosity) |
|---|---|---|---|
| | P2 | P3 | P6 |
| initial at 176° C. | 240 | 245 | 275 |
| 1 h at 176° C. | 160 | 196 | 211 |
| 2 h at 176° C. | 84 | 198 | 170 |
| 3 h at 176° C. | 36 | 242 | 257 |
| 4 h at 176° C. | 31 | 70 | 291 |

In order to more realistically represent the conditions of application with more aggressive conditions with a very alkaline pH, lime at 0.1% is added to the potassium chloride solution. Identical ageing at 176° C. is carried out:

| REF | counterexamples (viscosity) | | Examples (viscosity) | | | | |
|---|---|---|---|---|---|---|---|
| | P2 | P3 | P6 | P7 | P8 | P10 | P11 |
| initial at 176° C. | 245 | 258 | 214 | 100 | 179 | 225 | 256 |
| 1 h at 176° C. | 220 | 151 | 111 | 91 | 172 | 205 | 229 |
| 2 h at 176° C. | 32 | 270 | 138 | 90 | 167 | 195 | 224 |
| 3 h at 176° C. | 30 | 93 | 142 | 81 | 158 | 190 | 218 |
| 4 h at 176° C. | 28 | 43 | 102 | 74 | / | / | / |
| % viscosity after 3 h | 12% | 36% | 66% | 81% | 88% | 84% | 85% |

Example 3—Baryte Particle Suspension

The improved capacity of the microgels according to the invention to suspend the particles is demonstrated using a formulation of drilling mud type in which baryte particles must be kept in suspension. The microgels of polymer that result from the above synthesis examples and also baryte are dispersed in a 2% aqueous solution of potassium chloride to which 0.1% lime (CaOH$_2$) is added. The formulations are prepared in a 2 l beaker with stirring by a deflocculating blade 55 mm in diameter, with a rotational speed of 400 to 1000 revolutions per minute.

The preparation of the dispersions is summarized in the table below:

| product | weight (g) | order of introduction | stirring time |
|---|---|---|---|
| base fluid (2% KCl + 0.1% Ca(OH)$_2$) | 700 | 1 | |
| polymer microgel | 7 | 2 | stirring 15 min |
| Baryte (BaSO$_4$) | 196 | 3 | stirring 15 min |

The dispersions thus obtained are then conditioned for 20 min in an atmospheric consistometer (model 1250 from Chandler Engineering) at a temperature of 88° C. The stability of the suspension after conditioning is evaluated by transferring the dispersion into a 100 ml stoppered measuring cylinder which is placed in an incubator at 88° C. for 2 hours.

After a period of 2 hours at 88° C., the densities of the 10 ml at the top ($\rho_{90}$) and 10 ml at the bottom ($\rho_{10}$) of the measuring cylinder are measured, and the percentage difference in density is determined using the following formula:

$$\% \, \Delta\rho = \frac{2(\rho_{10} - \rho_{90})}{(\rho_{10} + \rho_{90})} \times 100$$

When the stability of the suspension is sufficiently good, that is to say that excessive segmentation of the baryte particles is not observed, a fluid loss control test is carried out at 88° C. in a press filter (model 170-01-2 supplied by OFITE) under pressure of 35 bar on a ceramic disc with a pore size of 40 μm, of model 170-51 supplied by OFITE instruments. A fluid loss control is considered to be very satisfactory under these conditions if the volume collected is less than 25 ml over the course of 30 min.

|  | Counterexamples | | | | examples | | | |
| --- | --- | --- | --- | --- | --- | --- | --- | --- |
| REF | P1 | P2 | P4 | P5 | P7 | P9 | P10 | P11 |
| % Δρ | 27 | 15 | 29 | 32 | 4.2 | 3.7 | 1.8 | 1.8 |
| fluid loss (ml over course of 30 min) | / | / | / | / | 13 | 16 | 7 | 10 |

The invention claimed is:

1. A process for preparing a polymer, the process comprising a micellar radical polymerization step (E) wherein the following are brought into contact, in an aqueous medium (M):
- monomers (m1), dissolved or dispersed in said aqueous medium (M), termed hydrophilic monomers (m1);
- monomers (m2) in the form of a micellar solution, namely a solution containing, in dispersed form in the aqueous medium (M), micelles comprising these monomers (m2), termed hydrophobic monomers (m2);
- wherein said monomers (m1) and/or (m2) comprise crosslinking monomers (mR) comprising at least two ethylenic unsaturations, wherein the crosslinking monomers (mR) comprise hydrophilic crosslinking monomers (mR1) and/or hydrophobic crosslinking monomers (mR2);
- at least one radical polymerization initiator; and
- optionally, at least one radical polymerization control agent
- wherein the concentration of crosslinking monomers (mR) is from 100 ppm to 1000 ppm, by weight relative to the total weight of all the monomers present in the aqueous medium (M).

2. The process as claimed in claim 1, wherein step (E) is carried out in the presence of hydrophobic monomers (m2) which comprise, hydrophobic crosslinking monomers (mR2).

3. The process as claimed in claim 1, wherein step (E) is carried out in the presence of hydrophilic monomers (m1), only a part of which consists of hydrophilic crosslinking monomers (mR1).

4. The process as claimed in claim 1, wherein the process comprises a step (E2) after step (E), wherein the polymers obtained at the end of step (E) are milled, as a result of which the polymers are obtained in the form of dispersed particles.

5. The process as claimed in claim 1, wherein the mole ratio (mR)/(m1), corresponding to the amount of crosslinking monomers (mR) relative to the total amount of hydrophilic monomers, is between 0.01 and 0.1%.

6. The process as claimed in claim 1, wherein the radical polymerization control agent is a compound which comprises a thiocarbonylthio —S(C=S)— group.

7. The process as claimed in claim 1, wherein the hydrophobic crosslinking monomers (mR2) are selected from the group consisting of divinylbenzene (DVB), and derivatives thereof.

8. The process according to claim 1, wherein the hydrophilic crosslinking monomers (mR1) are chosen from selected from the group consisting of N,N'-methylenebisacrylamide (MBA), polyethylene glycol (PEG) diacrylate, triacrylate, divinyl ether, and derivatives thereof.

9. The process as claimed in claim 2, wherein step (E) is carried out in the presence of hydrophobic monomers (m2) which consist exclusively of hydrophobic crosslinking monomers (mR2).

10. The process as claimed in claim 5 claim 1, wherein the concentration of monomers (mR) is from 200 to 600 ppm by weight relative to the total weight of all the monomers present in the medium (E).

11. The process as claimed in claim 6, wherein the radical polymerization control agent is a compound which comprises a xanthate group.

12. The process as claimed in claim 1, wherein the at least one radical polymerization initiator is water-soluble or water-dispersible.

* * * * *